Patented Jan. 1, 1946

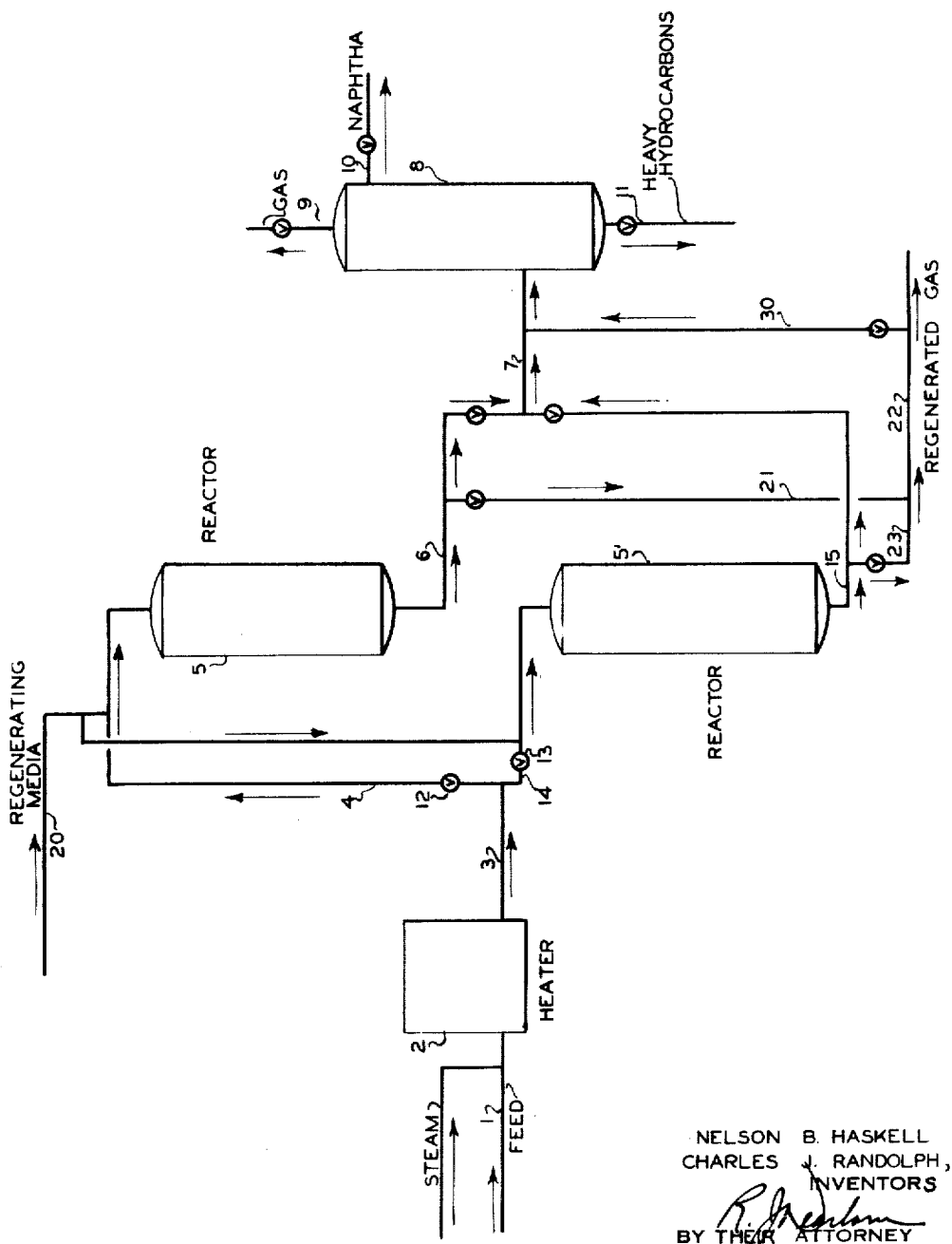

2,392,000

UNITED STATES PATENT OFFICE 2,392,000

POLYMERIZATION OF HYDROCARBONS

Charles J. Randolph, Jr., Louisville, Ky., and Nelson B. Haskell, Port Arthur, Tex., assignors to The Texas Company, New York, N. Y., a corporation of Delaware Application July 2, 1943, Serial No. 493,186

4 Claims. (Cl. 260—666)

This invention relates to the polymerization of hydrocarbons such as normally gaseous olefins to produce naphtha hydrocarbons and particularly naphtha hydrocarbons having a low content of unsaturated hydrocarbons.

The invention involves polymerizing normally gaseous olefins such as propylene by contact with a solid polymerizing catalyst of the alumina-silica type and more particularly a catalyst consisting essentially of a mixture of silica, alumina and zirconia.

Polymerization of hydrocarbons by contact with a catalyst of the foregoing character has been described in U. S. Patent No. 2,249,583, which broadly discloses subjecting olefins to contact with such a catalyst at temperatures ranging from 200 to 600° F. and under pressures ranging from 400 to 4000 pounds per square inch.

Polymer gasoline as produced heretofore is characterized by having a relatively high content of unsaturated hydrocarbons as indicated by its relatively high bromine number. The presence of unsaturated constituents in the gasoline results in its having a relatively low lead susceptibility as compared with the lead susceptibility of gasoline composed of saturated hydrocarbons.

The present invention is concerned with the discovery of critical conditions of operation under which a colorless or substantially colorless polymer gasoline is produced which is relatively low in unsaturated constituents as evidenced by its having a low bromine number, substantially below 20, for example.

More specifically the invention comprises subjecting the olefins undergoing treatment to contact with the silica-alumina type catalyst at a temperature within the range about 425 to 560° F. under conditions such that the catalyst remains in contact with the hydrocarbons undergoing treatment for not longer than about 5 hours between catalyst regenerations. In other words, the fresh, or freshly activated catalyst is maintained onstream for a matter of 2 or 3 hours and not in excess of 5 hours, following which it is regenerated prior to further contact with feed olefins under the conditions specific and for the purpose of producing the desired product. The partially spent catalyst may be continued onstream for the production of a product of different character until completely spent and then regenerated.

Advantageously the regenerated or fresh catalyst is initially pretreated by contact with the feed olefins at a temperature in the range 75 to 300° F. for a period of about 40 to 60 minutes.

Also it is advantageous to effect the conversion in the presence of a small amount of moisture. For example, moisture adsorbed on the catalyst during contact with superheated steam at 550° F. for 3 to 7 hours exerts a beneficial effect. The amount of water employed may range from a fraction of a per cent to several per cent by weight of the feed oil.

In accordance with the invention the process may be carried out in a fixed bed type of operation wherein a plurality of reactors are employed, each reactor containing a stationary porous mass of the catalyst. The stream of feed hydrocarbons at conversion temperature is passed continuously through a contact mass for the predetermined period of time and thereafter the stream is diverted to an adjacent reactor wherein it is passed through the contact mass contained therein. During the period of diversion the offstream contact mass is regenerated and activated so that it may again be placed onstream.

Reference may be made to the accompanying drawing comprising a simple diagram illustrating one method of flow which may be employed.

Thus, referring to the drawing a stream of feed olefin, as, for example, propylene, may be drawn from a source not shown and conducted through a pipe 1. The propylene is passed through a heater 2 wherein it is raised to the predetermined temperature level within the range about 425 to 560° F. The heated stream in gas phase and under a pressure of about 150 pounds per square inch gauge is then conducted through a pipe 3 and branch pipe 4 leading to a reactor 5.

The reactor 5 may be of conventional design and may also be provided with suitable means for controlling the temperature of the reaction. Thus, means may be provided for removing the exothermic heat of the polymerization reaction so that the temperature of the contact mass will not exceed about 560° F.

The hydrocarbon flow through the contact mass is maintained such that the mass velocity through the catalyst mass is in the range about 0.25 to 0.55 pound of hydrocarbon feed per pound of catalyst per hour.

The effluent hydrocarbon stream containing polymerized hydrocarbons is conducted from the reactor through a pipe 6 communicating with a pipe 7 which leads to a fractionator or fractionating unit 8.

The fractionator unit 8 may comprise one or more fractionating towers so as to separate the product into a gaseous fraction comprising unreacted hydrocarbons, a naphtha fraction comprising the desired gasoline product, and a higher boiling fraction comprising hydrocarbons boiling above the range for gasoline.

Thus, the gas fraction may be removed through a pipe 9, the naphtha through a pipe 10 and the higher boiling fraction through a pipe 11.

It will be understood, of course, that the gas fraction all or in part or the olefinic constituents thereof all or in part may be recycled through the polymerization reaction.

The flow of feed hydrocarbon through the reactor 5 is continued for a period of 2 or 3 hours and is then diverted from the reactor 5 by closing the valve 12 and opening the valve 13 in the branch pipe 14.

The branch pipe 14 communicates with a reactor 5' so that the feed stream is then continuously passed through the reactor 5' maintained under the aforesaid predetermined temperature conditions. The reactor 5' is thus onstream while the reactor 5 is offstream.

As indicated in the drawing the effluent stream of hydrocarbons from the reactor 5' flows through a pipe 15 which communicates with the previously mentioned pipe 7 leading to the fractionator.

The contact mass in the offstream reactor 5 will be contaminated with a carbonaceous deposit and this deposit is removed by oxidation during the offstream period. This is accomplished by introducing a suitable oxidizing medium such as air or other oxygen-bearing gas through a pipe 20 communicating with the previously mentioned pipe 4. Although not shown in the drawing means are provided for heating the regenerating gas to the proper temperature prior to introduction to the reactor so as to effect the necessary combustion.

Means may also be provided for controlling the temperature of combustion so as not to injure the catalyst during the removal of the carbonaceous deposit.

The regeneration gas formed during the regeneration is drawn off through the pipe 6 and a branch pipe 21 communicates with a pipe 22 through which the regeneration gas may be discharged from the system for disposition in any suitable manner.

Likewise during regeneration of the contact mass in the reactor 5' the regeneration gas is removed through pipe 15 and a branch pipe 23 communicating with the previously mentioned pipe 22.

Following removal of the carbonaceous deposit in this way the regenerated contact mass can then be activated by passing a stream of the feed olefin therethrough at a temperature in the range about 75 to 300° F. for a period not in excess of about one hour. This pre-activation prolongs for 3–5 hours the onstream period for the contact mass during which the desired saturated polymer gasoline is produced and which product is colorless and characterized by having a low bromine number of about 1 to 10 and substantially below 20. The hydrocarbon material discharged from the reactor during the pre-activation period may contain a small amount of polymer material and, therefore, it may be passed to the fractionator 8 through a branch pipe 30. On the other hand it may be recycled to the feed passing through the contact mass during onstream period.

It is also contemplated that the pre-activation in question may form the initial portion of the onstream period. In such case provision is made for introducing the feed stream at the lower temperature for the requisite period of time, following which the temperature of the entering feed stream is raised to the range 425 to 560° F.

In the following examples propylene was subjected to polymerization by the action of a catalyst of the character described in U. S. 2,249,583. Such a catalyst consists essentially of a calcined mixture of a major proportion of precipitated silica and minor proportions of precipitated alumina and zirconia and may have approximately the following composition:

$$100SiO_2 : 2Al_2O_3 : 12ZrO_2$$

The reaction was carried out by continuously passing a stream of propylene in gas phase through a contact mass of the catalyst maintained at a predetermined reaction temperature.

*Example A*

| Temp., °F. | Time, hrs. | MV | Yield | Br. No. | Olefins | Aromatics | Saturates |
|---|---|---|---|---|---|---|---|
| 495 | 1 | 0.377 | 70.6 | 2 | 1 | 7 | 92 |
| 470 | 2½ | .415 | 67.0 | 5 | 4 | 24 | 72 |
| 481 | 5¾ | .494 | 34.9 | 127 | 93 | 3 | 4 |

In the foregoing tabulation the temperature is measured in °F. and represents the average reaction temperature of the contact mass; time refers to the length of time in hours that the contact mass has been onstream; MV represents the mass velocity in pounds of charge per pound of catalyst per hour; yield represents the weight per cent of the polymer product, basis propylene feed; Br. No. refers to the bromine number of the polymer product; and olefins, aromatics and saturates represent the per cent by weight of these constituents in the polymer product.

As indicated by the tabulated data in Example A the polymer product obtained during the first 2½ hours' onstream was characterized by a relatively low bromine number and had a low olefin content not in excess of about 4%. However, by continuing the run onstream for 5¾ hours the sample obtained at that instant was characterized by a high bromine number, namely, 127, and had an olefin content of 93%, thus indicating the desirability of not maintaining the contact mass onstream for longer than about 5 hours at the outside.

*Example B*

| Temp., °F. | Time, hrs. | MV | Yield | Br. No. | Olefins | Aromatics | Saturates |
|---|---|---|---|---|---|---|---|
| 340 | ½ | 0.505 | 39.2 | 66 | 47 | 0 | 53 |
| 423 | 1 | .841 | 43.8 | 68 | 51 | 0 | 49 |

Example B also indicates that an operating temperature of as low as 340° F. results in production of a polymer of high olefin content and likewise it is apparent that by increasing the temperature to 423° F. but at the same time increasing the mass velocity results in a polymer product of substantially similar character.

*Example C*

| Temp., °F. | Time, hrs. | MV | Yield | Br. No. | Olefins | Aromatics | Saturates |
|---|---|---|---|---|---|---|---|
| 600 | ½ | 0.85 | 29.5 | 45 | 32 | 19 | 49 |

Example C indicates that with a relatively high reaction temperature the resulting polymer also contains a high olefin content.

Thus, it is apparent from the foregoing examples that by effecting the polymerization reaction within a relatively narrow range of temperature, namely, about 425 to 560° F. with a mass velocity ranging from about .25 to .55 the polymer gasoline product so obtained is characterized by being highly saturated in nature and contains a very limited amount of unsaturated constituents. The gasoline so obtained will be colorless and have a clear octane number of about 77 CFRM. The addition of 3 ccs. of TEL raises the octane number to about 86.

Obviously many modifications and variations of the invention, as hereinbefore set forth may be made without departing from the spirit and scope thereof, and therefore only such limitations should be imposed as are indicated in the appended claims.

We claim:

1. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at an elevated temperature in the range about 470 to 495° F., passing the hydrocarbons through the contact mass at a rate within the range about 0.25 to 0.55 pound per pound of catalyst per hour, maintaining the catalyst in contact with feed hydrocarbons for not in excess of about 2 to 3 hours without regeneration, and discharging from the reaction zone an effluent stream the major proportion of which is polymer naphtha relatively free from aromatics and consisting mainly of saturates, said naphtha being characterized by a bromine number substantially less than about 10.

2. A process according to claim 1 in which the catalyst is initially activated by passing feed olefin in contact with it at a temperature of about 75 to 300° F. for about 40 to 60 minutes.

3. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at a temperature in the range about 470 to 495° F., passing the hydrocarbons through the contact mass at a rate of about .37 to .41 pound per pound of catalyst per hour, maintaining the catalyst in contact with feed hydrocarbons for not in excess of about 2 to 3 hours without regeneration, and discharging from the reaction zone an effluent stream containing in excess of 34.9 weight per cent polymer naphtha relatively free from aromatics and consisting mainly of saturates, said naphtha being characterized by a bromine number not in excess of about 5.

4. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at a temperature in the range about 470 to 495° F., passing the hydrocarbons through the contact mass at a rate of about .37 to .41 pound per pound of catalyst per hour, maintaining the catalyst in contact with feed hydrocarbons for not in excess of about 2 to 3 hours without regeneration, and discharging from the reaction zone an effluent stream containing at least about 67 weight per cent polymer naphtha relatively free from aromatics and consisting mainly of saturates, said naphtha being characterized by a bromine number substantially less than about 10.

CHARLES J. RANDOLPH, JR.
NELSON B. HASKELL.

---

Certificate of Correction

Patent No. 2,392,000.                                                          January 1, 1946.

CHARLES J. RANDOLPH, JR., ET AL.

It is hereby certified that error appears in the printed specification of the above numbered patent requiring correction as follows: Page 1, first column, line 17, for "600° F." read *650° F.*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.* reaction temperature the resulting polymer also contains a high olefin content.

Thus, it is apparent from the foregoing examples that by effecting the polymerization reaction within a relatively narrow range of temperature, namely, about 425 to 560° F. with a mass velocity ranging from about .25 to .55 the polymer gasoline product so obtained is characterized by being highly saturated in nature and contains a very limited amount of unsaturated constituents. The gasoline so obtained will be colorless and have a clear octane number of about 77 CFRM. The addition of 3 ccs. of TEL raises the octane number to about 86.

Obviously many modifications and variations of the invention, as hereinbefore set forth may be made without departing from the spirit and scope thereof, and therefore only such limitations should be imposed as are indicated in the appended claims.

We claim:

1. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at an elevated temperature in the range about 470 to 495° F., passing the hydrocarbons through the contact mass at a rate within the range about 0.25 to 0.55 pound per pound of catalyst per hour, maintaining the catalyst in contact with feed hydrocarbons for not in excess of about 2 to 3 hours without regeneration, and discharging from the reaction zone an effluent stream the major proportion of which is polymer naphtha relatively free from aromatics and consisting mainly of saturates, said naphtha being characterized by a bromine number substantially less than about 10.

2. A process according to claim 1 in which the catalyst is initially activated by passing feed olefin in contact with it at a temperature of about 75 to 300° F. for about 40 to 60 minutes.

3. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at a temperature in the range about 470 to 495° F., passing the hydrocarbons through the contact mass at a rate of about .37 to .41 pound per pound of catalyst per hour, maintaining the catalyst in contact with feed hydrocarbons for not in excess of about 2 to 3 hours without regeneration, and discharging from the reaction zone an effluent stream containing in excess of 34.9 weight per cent polymer naphtha relatively free from aromatics and consisting mainly of saturates, said naphtha being characterized by a bromine number not in excess of about 5.

4. A process for producing polymer naphtha which comprises passing a stream of hydrocarbon vapor consisting essentially of propylene through a contact mass of polymerization catalyst consisting essentially of a calcined mixture of precipitated silica, alumina, and zirconia and having the approximate composition:

$$100SiO_2:2Al_2O_3:12ZrO_2$$

maintaining the mass in a reaction zone at a temperature in the range about 470 to 495° F., passing the hydrocarbons through the contact mass at a rate of about .37 to .41 pound per pound of catalyst per hour, maintaining the catalyst in contact with feed hydrocarbons for not in excess of about 2 to 3 hours without regeneration, and discharging from the reaction zone an effluent stream containing at least about 67 weight per cent polymer naphtha relatively free from aromatics and consisting mainly of saturates, said naphtha being characterized by a bromine number substantially less than about 10.

CHARLES J. RANDOLPH, JR.
NELSON B. HASKELL.

---

Certificate of Correction

Patent No. 2,392,000.  January 1, 1946.

CHARLES J. RANDOLPH, JR., ET AL.

It is hereby certified that error appears in the printed specification of the above numbered patent requiring correction as follows: Page 1, first column, line 17, for "600° F." read *650° F.*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*